Oct. 6, 1970  M. S. SELWA ET AL  3,532,358
INFLATABLE DEVICE

Filed July 22, 1968

INVENTORS.
Michael S. Selwa,
Philip J. Willson,
BY Maurice B. Leising.

Harness, Talburtt & Baldwin
ATTORNEYS.

Oct. 6, 1970  M. S. SELWA ET AL  3,532,358
INFLATABLE DEVICE
Filed July 22, 1968  2 Sheets-Sheet 2
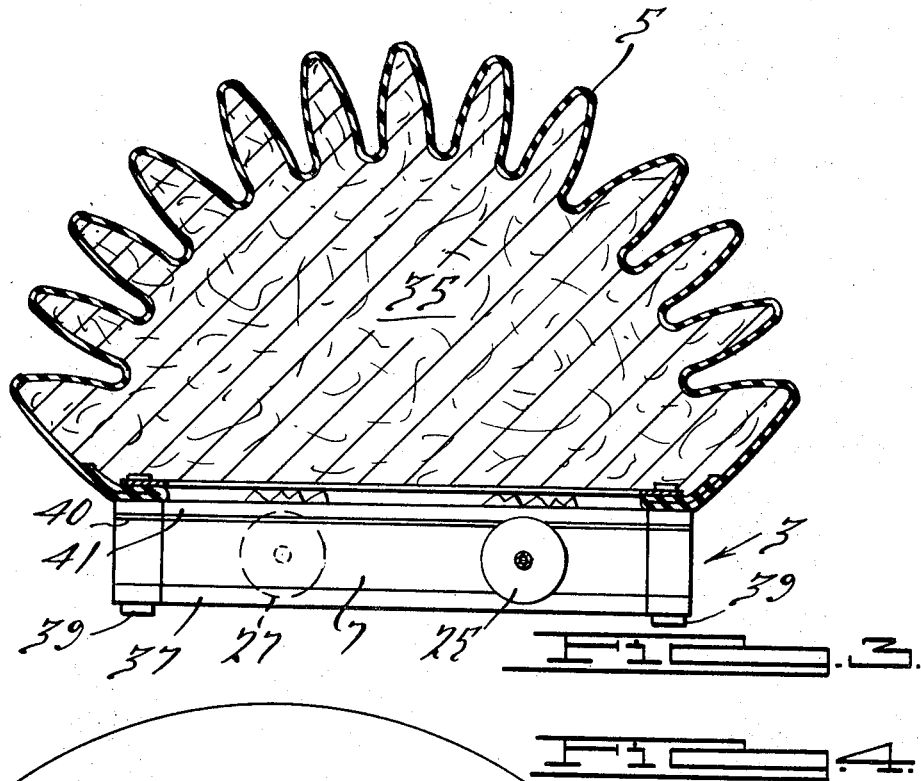
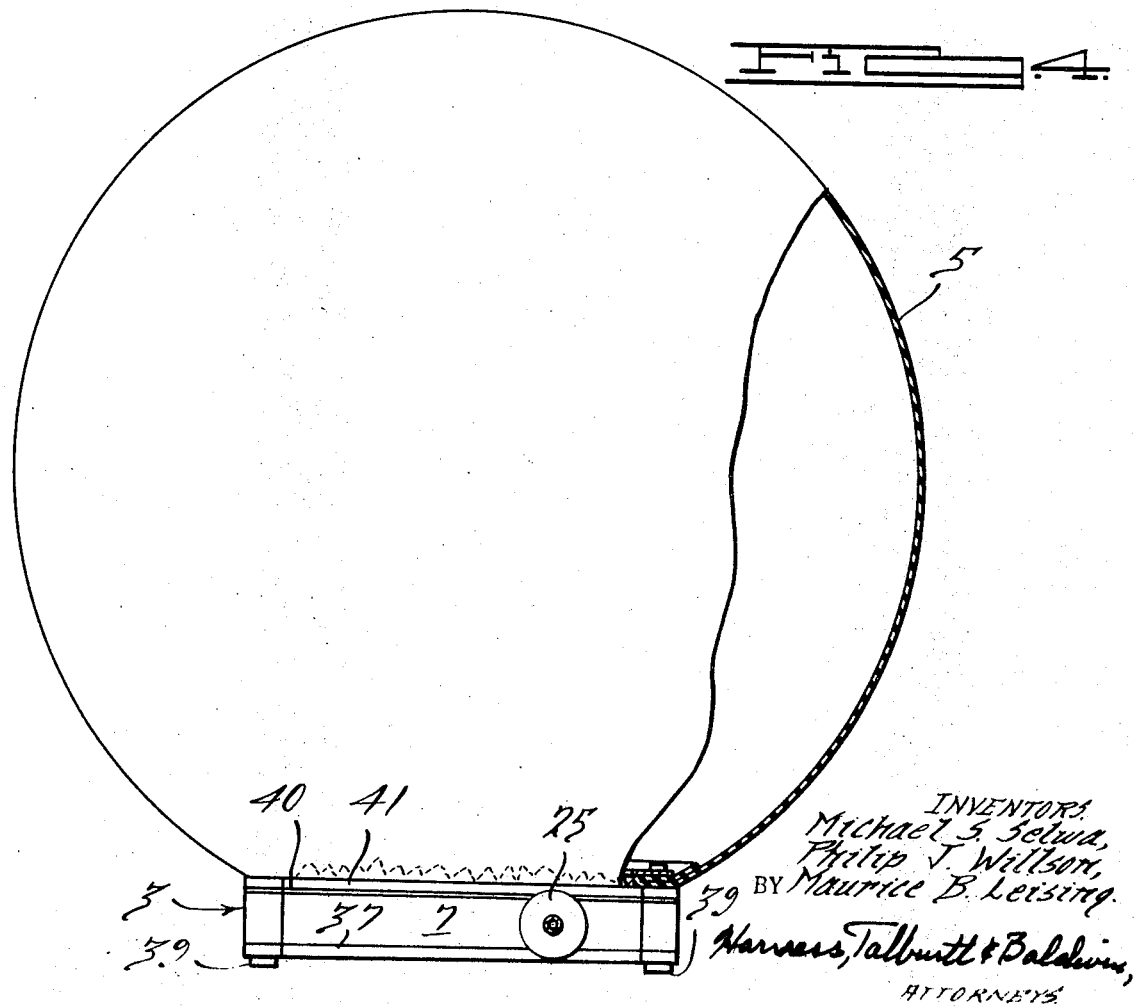
INVENTORS
Michael S. Selwa,
Philip J. Willson,
BY Maurice B. Leising.
Harness, Talburtt & Baldwin,
ATTORNEYS United States Patent Office 3,532,358
Patented Oct. 6, 1970

3,532,358
INFLATABLE DEVICE
Michael S. Selwa, Troy, Philip J. Willson, Royal Oak, and Maurice B. Leising, Clawson, Mich., assignors to Chrysler Corporation, Highland Park, Mich., a corporation of Delaware
Filed July 22, 1968, Ser. No. 746,333
Int. Cl. B60r *21/00*
U.S. Cl. 280—150                                26 Claims

ABSTRACT OF THE DISCLOSURE

Gas generator having a folded inflatable bag connected thereto, the generator having a plurality of pockets confining propellant. Electrical ignition devices ignite the propellant in two pockets first to release gas for deploying and partially inflating the folded bag. Propellant filled channels connect the two initially ignited propellant pockets to the remaining pockets for igniting the latter to release gas for inflating the bag to a desired pressure or to a substantially fully inflated condition.

BACKGROUND OF THE INVENTION

This invention relates to a gas generator and inflatable bag device, and more particularly to such a device particularly adapted for use in automotive vehicles.

Many types of gas source or generator and inflatable bag devices particularly adapted for use in automotive vehicles are known. For example, some of these devices employ a sealed cylinder of compressed gas connected directly or by a conduit to an inflatable bag mounted on the interior of the vehicle. A sensing device is conventionally provided for sensing rapid deceleration or change in velocity of the vehicle. Upon a predetermined change in vehicle velocity, such as upon impact with another object, the sensing device causes a signal to be sent to an actuating device for breaking the seal on cylinder to release the gas to the bag. The latter inflates and provides a cushion against which an occupant may be thrown by the impact.

Many of the known types of devices of this class require rather complicated and large components. The cylinder, for example, containing the compressed gas, is often relatively bulky. Moreover, the bags of these devices could rupture during inflation due to frictional interlocking of one portion of the bag with another portion thereof. The present invention overcomes many of the disadvantages of the known devices.

BRIEF SUMMARY OF THE INVENTION

Briefly, this invention comprises an inflatable bag and a gas generator, the latter having a primary or initial supply of propellant for partially expanding the bag and a second supply of propellant, ignited subsequent to the first supply, for continuing the inflation of the bag.

One of the primary objects of this invention is to provide a gas generating and inflatable bag device which is adapted to fully inflate the bag very rapidly after a signal requesting inflation is transmitted to the device.

Another object of this invention is to provide a device of the class described which generates the gas at a relatively low pressure.

A further object of this invention is to provide a device of the type described which permits the gas generator and the inflatable bag to be located in close proximity to one another.

Still another object of this invention is to provide a device such as described which inhibits bag rupture during initial inflating of the bag from a normally collapsed position.

Another object of this invention is to provide a device of the class described which is relatively compact in construction.

A still further object of this invention is to provide a device of the general type described which is simple and economical in construction and efficient in operation.

Other objects and advantages will become apparent as the description progresses.

BRIEF DESCRIPTION OF THE DRAWINGS

Referring to the drawings, in which one of various possible embodiments of this invention is illustrated.

FIG. 3 is a view generally similar to FIG. 1, showing the bag during the initial stages of inflation; and FIG. 4 is a view generally similar to FIG. 3 showing the final stages of bag inflation.

Like parts are indicated by corresponding reference characters throughout the several views of the drawings.

DESCRIPTION OF THE PREFERRED EMBODIMENT

Figure 1:
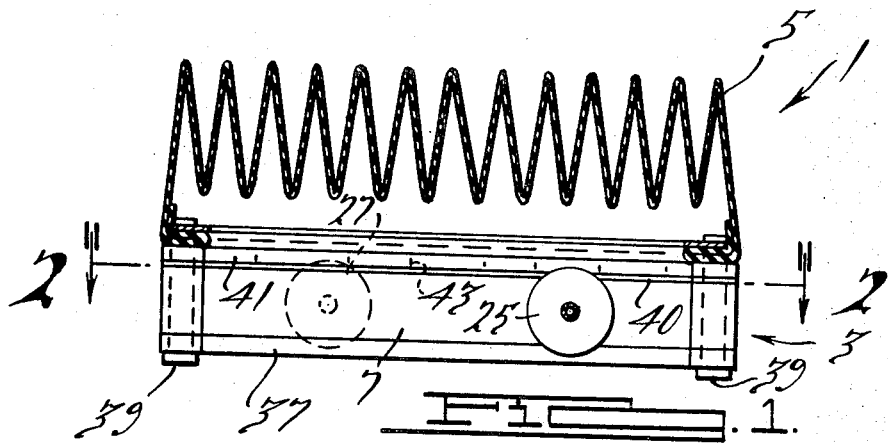
FIG. 1 is a side elevation, certain parts being shown in section, of a device constructed in accordance with this invention.
Figure 2:
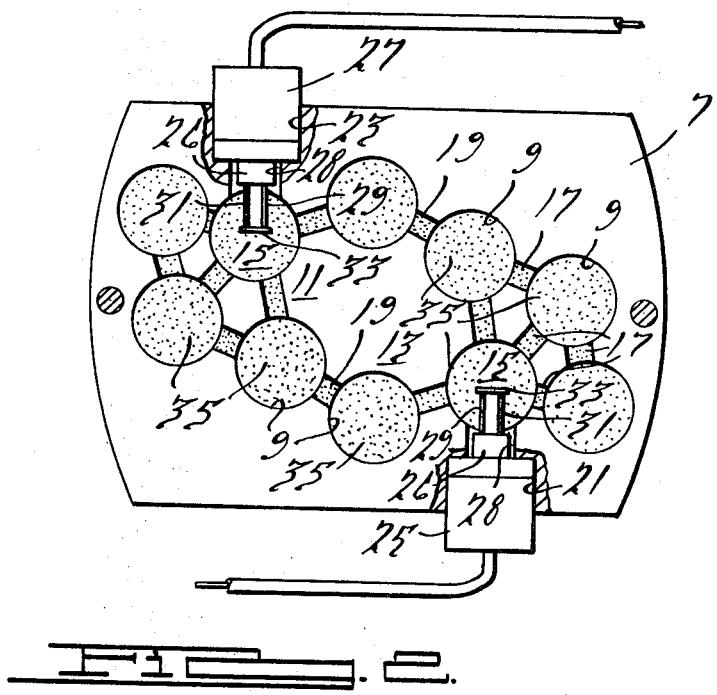
FIG. 2 is a section taken generally along lines 2—2 of FIG. 1.

Referring now to the drawings, a device constructed in accordance with this invention is generally indicated at 1. It includes a gas generator 3 and an inflatable bag 5.

Gas generator 3 includes a main body member 7 having a plurality of cavities or pockets 9 therein. As shown, the confining means or pockets 9 are formed into two groups or sets generally designated 11 and 13. However, the number of groups and pockets may vary considerably without departing from the spirit of this invention.

As shown, each group 11 and 13 includes five pockets 9 with one pocket 15 being designated as the primary ignition pocket for the group and with the other four secondary ignition pockets 9 being arranged around the primary ignition pocket. Propellant confining channels or grooves 17 are provided in body 7 to join each of the pockets or compartments 9 in each group of pockets with both the primary ignition pocket 15 and with the next adjacent secondary ignition pocket. In addition, each group of pockets is interconnected to the other group of pockets by propellant confining channels or grooves 19 so that propellant, to be described hereinafter, ignited in one group of pockets may cause ignition of the propellant in all pockets.

Body 7 has recesses or bores 21 and 23 in which ignition devices 25 and 27 are located. The ignition devices may take various forms, such as fuses, ignition squibs, ignition train, or electrical igniters, for example. As shown, the ignition devices are formed of electrical igniters having extension portions 26 in smaller recesses 28 and two wire electrodes 29 and 31 joined together at the outer ends thereof by a tungsten filament 33. The outer ends of the electrodes 29 and 31 and filament 33 may be coated with a solution, such as a solution of 4.4 grams acryloid and 16.3 grams xylene, for example, which, when dried improves their durability.

The electrodes 29 and 31 and filament 33 of each igniter extend into the primary ignition pocket of the respective group of pockets. The outer ends per se of the electrodes 29 and 31 or the outer ends of the electrodes and the filament 33 may be coated with an ignition material adapted ot rapidly ignite a propellant, described hereinafter, in a minimum period of time, such as five milliseconds, for example, after current is passed through the electrodes and filament. It has been found that a mixture of approximately 30% potassium perchlorate and 70% zirconium, with the granular size of the majority of the zirconium granules being relatively small, such as less than ten microns, is adequate to insure ignition of propellant within five milliseconds after current begins to pass through the electrodes and filament.

Each of the pockets 9 and 15 and the channels 19 are provided with a supply of propellant material 35 adapted, when ignited, to burn rapidly. Many sophisticated or exotic propellants, such as rocket propellants, are adapted to burn rapidly only when ignited under relatively highly pressurized conditions. Inasmuch as it is not desirable or practical to utilize highly pressurized chambers in devices of the type herein described, such exotic propellants have not proved practical or reliable. However, the well-known propellant, commonly referred to as black powder, will burn very rapidly under relatively low pressures. As is well known, black powder is composed of a mixture of the following materials in approximately the following amount:

| | Percent |
|---|---|
| Potassium nitrate | 75 |
| Charcoal | 15 |
| Sulfur | 10 |

Generally speaking, the smaller the granule size of the particles the faster the burning rate of the mixture.

A lower plate 37 is attached to body 7 by fasteners 39 extending upwardly through the plate and the body. Extending across the upper surface of body 7 over all of the propellant filled pockets is a diaphragm 40, such as an aluminum foil diaphragm, for example. The diaphragm is held against the upper surface of body 7 by an upper plate 41 having holes 43 therethrough vertically aligned with the pockets in body 7. The diaphragm should be adapted to rupture when the pressure within each pocket reaches a relatively low predetermined value, such as, for example, 150 p.s.i. This pressure value of 150 p.s.i. is only exemplary and the rupture pressure value could be higher or lower, if desired.

Bag 5 is folded in a manner to provide a plurality of folds 45 therein located side-by-side and extending generally away from the generator. The outer edge or edges of the bag are folded double and secured to the periphery of the plate 41 by a ring member 47 clamped on the folded edges by fasteners 39. The bag is preferably formed of a flexible woven sheet material combined with a rubber material. As will be made apparent hereinafter, the folding of the bag in the manner shown and described permits free expansion of the bag without frictional interlocking of the bag material during initial stages of inflation.

Assuming the bag is in the position shown in FIG. 1, operation of the gas generator and inflatable bag device is as follows:

Electrical current is supplied to each of the ignition devices 23 and 25 through the wires connected thereto from a source (not shown) such as an automotive vehicle battery, for example. The current would be supplied in response to a signalling device adapted, for example, to sense an abrupt change in velocity of the vehicle, such as upon impact with another object.

When the current passes through the filaments 33, the powder in each of the primary ignition pockets 15 ignites and begins burning. A pressure of 150 p.s.i., for example, is rapidly attaned, i.e., within a few milliseconds, and this pressure ruptures the diaphragm 43 over the area of the primary ignition pockets. The powder in the primary ignition pockets which has not burned by the time the diaphragm ruptures is propelled or thrown, due to the 150 p.s.i. gas in the pockets, into the bag, bypassing the propellant in other pockets, and continues to burn. This initial delivery of gases and burning powder into the bag causes the latter to be thrown into a partially expanded position as generally shown in FIG. 3. Thus, the bag is thrown into this partially expanded position by considerably less than the full force which would be exerted thereon if all of the powder-filled pockets were ignited simultaneously. If the latter condition occurred, two or more of the folds of the bag might be forced together inhibiting bag expansion and resutling in unusually high instantaneous pressure which could rupture the bag.

While the bag is being thrown into the partially expanded position, the powder in the channels 17 extending from each of the primary ignition pockets burns and ignites the powder in pockets 9 surrounding each of the primary pockets. The diaphragm portions covering such remaining pockets quickly burst and the powder in such other pockets is also thrown into the bag as the expanding gases expand the bag. The powder thrown into the bag continues to burn to create gas for continuing the inflation of the bag until a desired pressure is created in the latter as shown in FIG. 4. The powder may, depending on its burning rate and time of ignition, continue to burn after inflation to maintain the bag in such condition and prevent deflation due to cooling of the gases.

If one of the ignition devices 25 should fail to ignite the propellant in the associated pocket 15, the pockets in the associated group of pockets will still be ignited by the propellant in the channels 19 interconnecting the two groups 11 and 13 of the pockets.

The total time period between passing current to the ignition devices and complete inflation of the bag is very short, such as 20-30 milliseconds, for example. The device may be placed in various locations on the interior of an automotive vehicle, such as on the upper end of the steering column, for example. If a vehicle impact is sensed, the bag can be rapidly inflated to provide a cushion agains which a vehicle occupant may be thrown.

As mentioned previously, the device of this invention preferably employs the use of a propellant, such as black powder, which is adapted to burn at very rapid rate under relatively low pressures to release gas. As used herein, the terms burn, burning, mean a reaction which produces or releases gas. Moreover, by providing for an initial ignition and burning of a part of the total propellant, followed by ignition and burning of the remaining propellant, with burning of all propellant continuing after the latter is thrown into the interior regions of the bag, rupturing of the bag may be avoided.

Moreover, the stages of inflation of the bag may be controlled by the arrangement and location of the propellant. For example, by proper arrangement and location of the propellant, and the proper selection of propellant, it may be possible to provide sufficient gas to maintain the bag at a desired pressure for an extended period of time so that the bag remains inflated in the event of second and subsequent impacts between a vehicle and other objects.

In view of the foregoing, it will be seen that the several objects and advantages of this invention are achieved.

Although only one embodiment of the invention has been disclosed and described, it is apparent that other embodiments and modifications of the invention are possible within the scope of the appended claims.

We claim:
1. Inflatable device comprising a gas generator, an inflatable bag connected to said gas generator, said gas generator having confining means, at least two supplies of ignitable propellant in said confining means, ignition means for igniting one supply of said propellant, means for igniting the other supply of propellant subsequent to the ignition of said one supply of propellant, said confining means including means for preventing escape of propellant from said confining means for a period of time after initial ignition of said propellant, said supplies of propellant being so located and said means for preventing escape of propellant being so located as to permit escape of the gases released by the ignited propellant of said one supply of propellant into said bag after sai dperiod of time to partially inflate said bag, the secotnd supply of propellant, when ignited, releasing gases which further inflate said bag.

2. Inflatable device as set forth in claim 1 wherein said means for preventing escape of propellant includes rupturable means.

3. Inflatable device as set forth in claim 2 wherein said rupturable means comprises a diaphragm.

4. Inflatable device comprising a gas generator and an inflatable bag connected to said gas generator, said gas generator having first confining means for holding a first supply of propellant, a first supply of ignitable propellant in said first confining means for releasing gases substantially directly into said bag to deploy and partially inflate the bag, second confining means for holding a second supply of ignitable propellant, a second supply of ignitable propellant in said second confining means, for releasing gases subsequent to the release of gases by said first supply of propellant to inflate said bag to a desired pressure, and ignition means for igniting said first supply of propellant.

5. Inflatable device as set forth in claim 4 wherein said bag, prior to inflation, has a plurality of folds extending across and generally away from said gas generator.

6. Inflatable device as set forth in claim 4 wherein said confining means includes means for preventing escape of propellant from said confining means for a period of time after ignition of said propellant, said means for preventing escape of propellant being adapted to permit escape of said propellant into said bag after said period of time.

7. Inflatable device as set forth in claim 6 wherein said means for preventing escape of propellant includes rupturable means.

8. Inflatable device as set forth in claim 7 wherein said rupturable means comprises a diaphragm.

9. Inflatable device as set forth in claim 4 wherein said means for igniting said first supply of propellant comprises an electrical filament through which electrical current may be passed.

10. Inflatable device as set forth in claim 4 wherein said means for igniting said first supply of propellant comprises electrical means through which electrical current may be passed, and ignition material surrounding said electrical means adapted to be ignited when electrical current is passed through said electrical means, said ignition material being adapted to ignite said first supply of propellant in less than ten milliseconds after current begins passing through said electrical means.

11. Inflatable device as set forth in claim 4 wherein said propellant comprises approximately 75% potassium nitrate, 15% charcoal and 10% sulfur.

12. Inflatable device comprising a gas generator, and an inflatable bag connected to said gas generator, said gas generator having first confining means for holding a first supply of propellant, a first supply of propellant in said first confining means, second confining means for holding a second supply of propellant, a second supply of propellant in said second confining means, ignition means connected to said generator for igniting said first supply of propellant, third confining means for holding a third supply of propellant, said third confining means interconnecting said first and second confining means, rupturable means covering said first and second confining means normally to prevent the egress of propellant therefrom, said rupturable means covering said first confining means rupturing when the pressure of the gases released by the ignited propellant in said first confining means reaches a predetermined value, the gases released by the ignited propellant in said first confining means inflating said bag to a partially inflated condition, said propellant in said first confining means igniting said propellant in said third confining means which ignites said propellant in said second confining means, the gases released by the ignited propellant in said second and third confining means causing the means covering said second confining means to rupture and causing said bag to be inflated to a substantially fully inflated position.

13. Inflatable device as set forth in claim 12 wherein said bag, prior to inflation, has a plurality of folds extending generally away from said gas generator.

14. Inflatable device as set forth in claim 13 wherein said means for igniting said first supply of propellant comprises an electrical filament through which electrical current may be passed.

15. Inflatable device comprising a gas generator and an inflatable bag connected to said generator, said gas generator having means for confining ignitable propellant therein, ignitable propellant in said confining means, and means for igniting said propellant in sequential stages, said propellant upon ignition releasing gas for inflating said bag, the stages of inflation of said bag being responsive to the sequential ignition of said propellant, said propellant being arranged to have at least one portion thereof ignited before a second portion thereof, the gases released by said one portion bypassing said second portion.

16. Inflatable device comprising a gas generator and an inflatable bag connected to said gas generator, said gas generator having a plurality of compartments therein, ignitable propellant in said compartments, the propellant in each compartment being adapted, when ignited, to release gas therefrom for inflating said bag, means for igniting the propellant in said compartments, and means for sequentially controlling the ignition of the propellant in said plurality of compartments to control the inflation of said bag in stages.

17. Inflatable device comprising a gas generator and an inflatable bag connected to said gas generator, said gas generator having first confining means for holding a first supply of propellant, a first supply of propellant in said first confining means, second confining means for holding a second supply of propellant, a second supply of propellant in said second confining means, ignition means for igniting said first supply of propellant, said first supply of propellant, upon ignition, releasing gases into said bag to deploy and partially inflate the latter, said second supply of propellant being ignited subsequent to said first supply of propellant, said second supply of propellant, upon ignition, releasing gases to inflate said bag to a desired pressure, said generator comprising a body, said first confining means comprising at least one pocket in said body, said second confining means including at least one pocket in said body and channel means in said body extending between said pocket of said first and second pockets.

18. Inflatable device as set forth in claim 17 wherein said bag, prior to inflation, has a plurality of folds extending generally away from said gas generator.

19. Inflatable device comprising a gas generator and an inflatable bag connected to said gas generator, said gas generator having first confining means for holding a first supply of propellant, a first supply of propellant in said first confining means, second confining means for holding a second supply of propellant, a second supply of propellant in said second confining means, ignition means for igniting said first supply of propellant, said first supply of propellant, upon ignition, releasing gases into said bag to deploy and partially inflate the latter, said second supply of propellant being ignited subsequent to said first supply of propellant, said second supply of propellant, upon ignition, releasing gases to inflate said bag to a desired pressure, said first confining means comprising at least two primary ignition pockets in said generator.

20. Inflatable device as set forth in claim 19 further including means connecting said first confining means to said second confining means for obtaining ignition of said second supply of propellant subsequent to ignition of said first supply of propellant.

21. Inflatable device comprising a gas generator and an inflatable bag connected to said gas generator, said gas generator having first confining means for holding a first supply of propellant, a first supply of propellant in said first confining means, second confining means for holding a second supply of propellant, a second supply of propellant in said second confining means, ignition means for igniting said first supply of propellant, said first supply of propellant, upon ignition, releasing gases into said bag to deploy and partially inflate the latter, said second supply of propellant being ignited subsequent to said first supply of propellant, said second supply of propellant, upon ignition, releasing gases to inflate said bag to a desired pressure, said means for igniting said first supply of propellant comprising electrical means through which electrical current may be passed, and ignition material surrounding said electrical means adapted to be ignited when electrical current is passed through said electrical means, said ignition material being adapted to ignite said first supply of propellant in less than ten milliseconds after current begins passing through said electrical means, said ignition material including zirconium.

22. Inflatable device as set forth in claim 21 wherein said propellant is adapted to burn after initial inflation of said bag to maintain pressure in said bag.

23. Inflatable device comprising a gas generator and an inflatable bag connected to said gas generator, said gas generator having first confining means for holding a first supply of propellant, a first supply of propellant in said first confining means, second confining means for holding a second supply of propellant, a second supply of propellant in said second confining means, ignition means for igniting said first suply of propellant, said first supply of propellant, upon ignition, releasing gases into said bag to deploy and partially inflate the latter, said second supply of propellant being ignited subsequent to said first supply of propellant, said second supply of propellant, upon ignition, releasing gases to inflate said bag to a desired pressure, said means for igniting said first supply of propellant comprising an electrical filament through which electrical current may be passed, said gas generator comprising a body, said first confining means comprising at least one pocket in said body, said second confining means including a plurality of pockets in said body and channel means in said body extending between said pocket of said first confining means and each pocket of said plurality of pockets.

24. Inflatable device as set forth in claim 23 wherein said bag, prior to inflation, has a plurality of folds extending generally away from said gas generator.

25. Inflatable device as set forth in claim 24 wherein said propellant comprises approximately 75% potassium nitrate, 15% charcoal and 10% sulfur.

26. Inflatable device comprising a gas generator and an inflatable bag in communication with said generator, said generator comprising a body, said body including gas generating material confining means, gas generating material in said confining means, said confining means including means normally inhibiting escape of said gas generating material from said confining means, said gas generating material being adapted to undergo a reaction and when undergoing a reaction, releasing gas, said gas, upon being released, passing into said bag for inflating the bag, means for initiating the reaction of said gas generating material, means for causing said gas generating material to react in such a manner as to cause said bag to be inflated in a plurality of stages, one stage being the initial deployment and partial inflation and at least one subsequent stage being the inflation of said bag to a desired pressure.

References Cited
UNITED STATES PATENTS

| | | | |
|---|---|---|---|
| 373,529 | 11/1887 | Lombard | 102—40 |
| 2,850,291 | 9/1958 | Ziccardi | 280—150 |
| 3,180,373 | 4/1965 | Hebenstreit | 23—281 X |
| 3,403,625 | 10/1968 | Jacobson et al. | 102—38 |
| 3,450,414 | 6/1969 | Kobori | 280—150 |
| 3,425,712 | 2/1969 | Berryman | 280—150 |
| 3,473,824 | 10/1969 | Carey et al. | 280—150 |

KENNETH H. BETTS, Primary Examiner

U.S. Cl. X.R.

23—281